United States Patent [19]
Yokota

[11] Patent Number: 4,656,508
[45] Date of Patent: Apr. 7, 1987

[54] MEASURING ENDOSCOPE

[75] Inventor: Akira Yokota, Hachiouji, Japan

[73] Assignee: Olympus Optical Co., Ltd., Tokyo, Japan

[21] Appl. No.: 742,057

[22] Filed: Jun. 6, 1985

[30] Foreign Application Priority Data

Jun. 8, 1984 [JP] Japan .................. 59-117930

[51] Int. Cl.$^4$ .............................................. H04N 7/18
[52] U.S. Cl. ..................................... 358/98; 358/107; 358/901
[58] Field of Search .................... 358/98, 88, 100–107, 358/96, 901; 128/4–11; 356/4.5, 5; 350/510

[56] References Cited

U.S. PATENT DOCUMENTS

| | | | |
|---|---|---|---|
| 3,327,712 | 6/1967 | Kaufman et al. | 358/901 X |
| 4,253,447 | 3/1981 | Moore et al. | 358/98 X |
| 4,331,132 | 5/1982 | Mukasa | 358/98 X |
| 4,480,636 | 11/1984 | Karaki et al. | 358/98 X |
| 4,558,691 | 12/1985 | Okada | 128/6 |
| 4,562,831 | 1/1986 | Murakoshi et al. | 358/98 X |

FOREIGN PATENT DOCUMENTS 2818760 11/1979 Fed. Rep. of Germany .
59-70908 4/1984 Japan .

OTHER PUBLICATIONS

Interactive Fringe Analysis System: Applications to Moire Contourogram and Interferogram, by T. Yatagai et al, Optical Engineering, Sep./Oct. 1982, vol. 21, No. 5, pp. 901–906.
Automatic Fringe Analysis Using Digital Image Processing Techniques, by T. Yatagai et al, Optical Engineering, May/Jun. 1982, vol. 21, No. 3, pp. 432–435.
Automatic Flatness Tester for Very Large Scale Integrated Circuit Wafers, by T. Yatagai et al, Optical Engineering, Jul./Aug. 1984, vol. 23, No. 4, pp. 401–405.

*Primary Examiner*—Howard W. Britton.
*Assistant Examiner*—Victor R. Kostak
*Attorney, Agent, or Firm*—Cushman, Darby & Cushman

[57] ABSTRACT

A measuring endoscope for making three-dimensional measurements of a object without using a special lattice and without hampering direct observation of the object. The measuring endoscope includes a light supply source for supplying illumination, and an illumination variation device for providing a plurality of particular illuminations, and illumination transmission means including a plurality of fiber optic cables. The fiber optic cables have a first input section separated from a second input section. The second section receives one particular illumination which the first section does not. At the output end of the fiber optic cables, fiber optic cables from the first section are interlaced, row-by-row with the fiber optic cables from the second section. An illumination lens then directs the light from the fiber optic cables onto the object. A lattice-shaped light pattern then appears on the object. Light reflected from the object is received by an objective lens system and is directed to an imaged sensor. The image sensor includes a large number of regularly arranged picture elements. Image processing devices then convert the received image into electrical signals. The image processing means process selected electrical signals from among all electrical signals received. These selected electrical signals are obtained from picture elements from positions where the lattice of the object image is formed on the light receiving surface. These selected electrical signals may then be processed to provide a three-dimensional measurement of the object. A control device controls the supply of light to the fiber optic cables to ensure that the light is emitted from the fiber optic cables in a lattice form. Finally, a display device connected to the image processor provides a display according to the three-dimensional image of the object.

23 Claims, 17 Drawing Figures

MEASURING ENDOSCOPE

BACKGROUND OF THE INVENTION (A) Field of the Invention

The present invention relates to an endoscope arranged to be able to perform a three-dimensional measurement by utilizing Moiré topography.

(B) Description of the Prior Art

In case Moiré topography is performed, it is in general necessary to provide a lattice for both the illumination optical system and the observation optical system. When it is intended to make an ordinary topographic observation by using these same optical systems, such a lattice hinders the observation. Especially, in case of a small-sized optical instrument such as endoscope, it is practically impossible to detachably mount a lattice within the foremost end portion of the instrument, and thus the prior known endoscope have the drawback that, for performing a Moiré topography and an ordinary endoscopic observation, two separate endoscopic instruments (each being designed for a different specific purpose) have to be used. Also, there has been placed on the market an endoscopic instrument in which the lattice for observation optical system is omitted because the image of an object is scanned by using a photomultiplier. In such an instrument, it has been impossible to house a photomultiplier within the small space at the foremost end portion of the instrument because the size thereof is too large.

SUMMARY OF THE INVENTION

It is, therefore, the primary object of the present invention to provide an endoscope which allows measurements including three-dimensional measurement by Moiré topography without the use of a special lattice and without affecting ordinary endoscopic observation in any way.

This object is achieved according to the present invention by the arrangement comprising: an illumination light supply consisting of a plurality of fine illuminating members which are disposed regularly; illumination optical system for projecting the beam of light of said light supply onto an object under study; a focusing optical system for forming the image of the object; image pickup means consisting of a plurality of picture elements regularly disposed at the position of the object image formed by the focusing optical system; and controlling means for controlling the illumination of the respective fine illuminating members to insure that the illumination light supply will illuminate in the form of lattice so that, by this lattice-form illumination given by the illumination light supply, there are performed measurements of the object including a three-dimensional measurement thereof.

According to a preferred formation of the present invention, the illumination light supply comprises a light guide which is formed by placing together a large number of optical fibers into a bundle and whose light-incidence end is bifurcated into two portions. It should be noted that those optical fibers in these two light-incidence end portions are arranged, at the single light-emission end of this light guide, in such a pattern that the optical fibers in one of the incidence end portion and those in the other incidence end portion Between the light supply and the light-incidence ends of the light guide, there is provided a rotary filter having a red light transmitting sector, a green light transmitting sector, a blue light transmitting sector and an infrared light transmitting sector. The infrared light transmitting sector is constructed so as to insure that the infrared light beam impinges onto only one of the two light-incidence ends of the light guide whereby allowing the illumination light supply to emit light with a lattice pattern.

According to another preferred formation of the present invention, the illumination light supply is constructed as an array of successively arranged LEDs emitting a red light, a green light, a blue light and an infrared light, respectively.

According to still another preferred formation of the present invention, one of the two light-incedince end portions of the light guide is covered with an infrared light cutting filter, and an incandescent light is used as the light supply. In this case, striped filters for separating colors are provided in the foreground of the image pickup device.

According to the present invention, it will be noted that, at the time of an ordinary endoscopic observation, it is possible to perform a three-dimansional measurement of an object under observation by Moiré topography without providing any visually obstructive lattice. It is also possible to indicate on a color display a compound image consisting of the image of the object under examination and a contour image formed by Moiré fringes superposed on the image of the object. Thus, it is possible to present, with an improved reality, the concavo-convex, i.e. uneven, pattern of the surface of the object under observation. Moreover, the system as a whole can be constructed in a compact size, so that the resulting endoscopic instrument can be used very conveniently.

These and other objects of the present invention will become more apparent during the course of the following description and appended claims.

DETAILED DESCRIPTION OF THE PREFERRED EMBODIMENTS

The present invention will hereunder be described with respect to the embodiments illustrated in the accompanying drawings.

Figure 1:
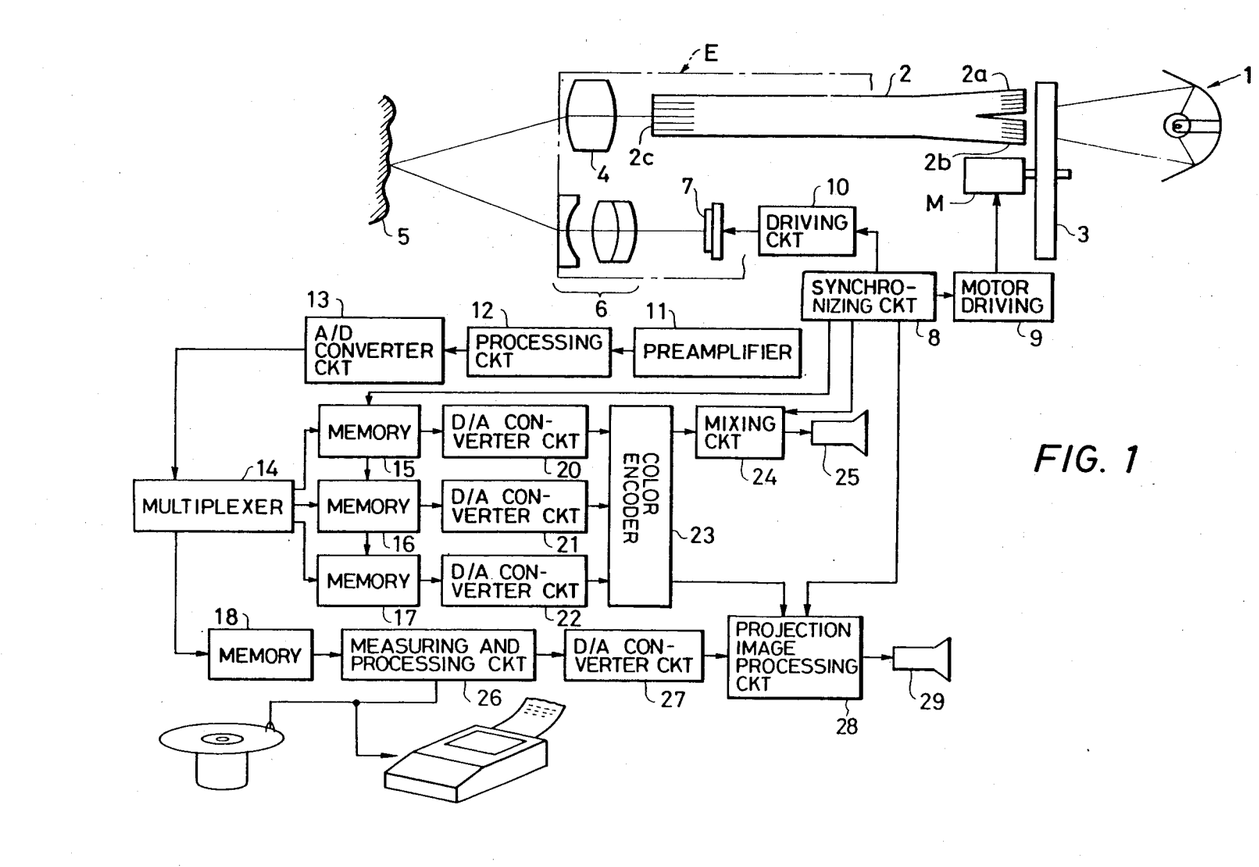
FIG. 1 is a diagrammatic general illustration of an embodiment of the endoscope according to the present invention.
Figure 2:
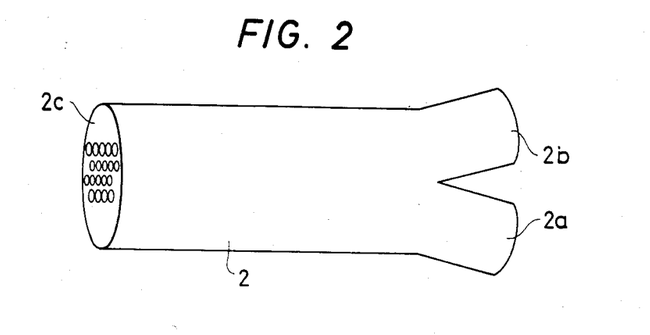
FIG. 2 is a diagrammatic detailed illustration of a light guide employed in the embodiment of FIG. 1.
Figure 3:
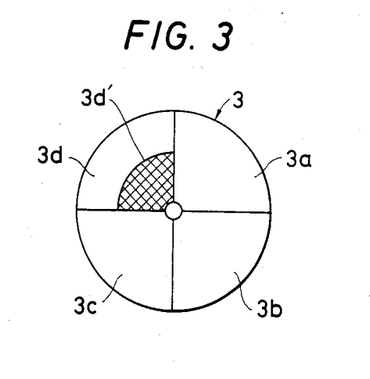
FIG. 3 is a diagrammatic front view of a rotary filter of FIG. 1.

In FIG. 1, reference numeral 1 represents a light supply lamp; 2 a light guide having bifurcated light-incidence ends 2a and 2b and having one light-emission end 2c where respective optical fibers are regularly arranged as shown in FIG. 2 in such a way that the optical fibers in the two light-incidence end portions 2a and 2b are arranged at the light-emission end in alternate rows of fibers relative to each other; 3 a rotary filter disposed between the light supply lamp 1 and the light-incidence ends of the light guide 2, and which is divided into four sectors consisting of a red light transmitting sector 3a, a green light transmitting sector 3b, a blue light transmitting sector 3c and an infrared light transmitting sector 3d as shown in FIG. 3. Furthermore, the infrared light transmitting sector 3d is constructed to have an opaque region 3d' to face the sector 2b of the light incidence end of the light guide 2 when the sector 3d is placed in a light path; 4 an illumination lens for projecting onto the object 5 under observation the light-emission end of the light guide 2 as being the illumination light supply which consists of a plurality of fine light-emitting members; 6 an objective lens of the observation optical system for forming the image of the object 5 under observation; and 7 a solid-state image sensor disposed at the focusing position of the objective lens 6. Numeral 8 represents a synchronizing circuit; 9 a motor driving circuit for driving a motor M which rotates the rotary filter 3 in accordance with a control signal delivered from the synchronous circuit 8; 10 a driving circuit for actuating the solid-state image sensor 7 based on a control signal delivered from the synchronous circuit 8; 11 a preamplifier for amplifying an output signal delivered from the solid-state image sensor 7; 12 a processing circuit; 13 an A/D converter circuit; 14 a multiplexer; 15 to 18 memories for being inputted with signals allotted, respectively, by the multiplexer 14 to correspond to the illuminations of red light, green light, blue light or infrared light emitting in synchronism with the rotation of the rotary filter 3; 20, 21 and 22 D/A converter circuits, respectively; 23 a color encoder; 24 a mixing circuit; 25 a color display; 26 a measuring and processing circuit for processing various data such as determination or identification of the frequency of Moiré fringes, removal of unwanted fringes, and so forth, and for performing image processing; 27 a D/A converter circuit; 28 a projection image processing circuit for converting that output of the measuring and processing circuit 26 which has already been converted by the D/A converter circuit 27 to an analog signal into a compound projection image signal; and 29 a color display for indicating a contour image of the object 5 under observation as depicted by Moiré fringes in accordance with the signal coming from the projection image processing circuit 28. The forward end portion of the light guide 2, the illuminating lens 4, the objective lens 6 and the solid-state image sensor 7 are housed especially in the foremost end portion of the main body E of the endoscope.

The embodiment of the present invention is construction as described above. Therefore, the beam of light emitting from the light supply lamp 1 is successively converted to a red light, a green light, a blue light and an infrared light along with the rotation of the rotary filter 3 driven by the motor M, to illuminate the object 5 of observation via the light guide 2 and the illuminating lens 4. It should be noted, however, that the beam of infrared light which is transmitted through the rotary filter 3 when the infrared light transmitting sector 3d of the rotary filter 3 is inserted in the path of light will enter into the light guide 2 only through the light-incidence end 2a thereof. Therefore, the infrared light beam will emit at the light-emission end of the light guide 2 through every other row of optical fibers. Thus, the object 5 under survey will be illuminated with stripes or fringes. On the other hand, when either one of the other light-transmitting sectors of the rotary filter 3, i.e. either the red light transmitting sector 3a, the green light transmitting sector 3b or the blue light transmitting sector 3c, is inserted in the path of light beam, it will be noted that the red light, the green light or the blue light which has transmitted through the rotary filter 3 will enter the light guide 2 through both of the light-incidence ends 2a and 2b of the light guide 2, and as a result the light beam will emit through the entire output region of the light-emission end 2c of the light guide 2. Accordingly, the object 5 under observation is illuminated uniformly. The light reflected from the illuminated object 5 under survey is thus focused on the solid-state image sensor 7 by the focusing lens 6. This solid-state image sensor 7 is actuated by the driving circuit 10 in synchronism with the rotation of the rotary filter 3 based on a control signal delivered from the synchronous circuit 8, and output signals of the image of the object produced by the red light, the green light, the blue light and the infrared light, successively. These signals which are outputted are amplified by the preamplifier 11 and are processed by the processing circuit 12, and they are converted to digital signals by the A/D converter 13, and these digital signals are allotted to respective memories 15 to 18, respectively, by the multiplexer 14. That is, the image signal produced by the red light is inputted to the memory 15; the image signal developed by the green light is inputted to the memory 16; the image signal formed by the blue light is inputted to the memory 17; and the image signal caused by the infrared light is inputted to the memory 18, respectively. Those image signals due to the red light, the green light and the blue light which have been stored in the memories 15, 16 and 17, respectively, are read out simultaneously by the timing signal coming from the synchronous circuit 8, and are converted to analog signals by the D/A converter circuits 20, 21 and 22, respectively, and are supplied to the color encoder 23, where video signals are produced. These video signals are supplied further to the mixing circuit 24 where they are added with a synchronous signal delivered from the synchronous circuit 8 to thereby become a compound projection image signal to be displayed on the color display 25. Also, the image signal due to the infrared light, which has been stored in the memory 19, is first processed by the measuring and processing circuit 26, and thereafter it is converted to an analog signal by the D/A converter circuit 27, and is supplied to the projection image processing circuit 28 where the signal is provided with a synchronous signal coming from a synchronous circuit 8. It should be noted here that, in case there is the need to superpose an ordinary image onto the image which may, for example, be of a contour pattern obtained from the measuring and processing circuit 26, said signal is made into a compound projection image signal which is produced by mixing the image signal with a signal coming from the color encoder 23, and this compound projection image signal is displayed by the color display 29 such as CRT.

The method of obtaining a contour image by processing image data stored in the memory 18 has already been put to practice and is known from, for example, Yatagai et al's Opt. Eng. 21 (1982) 901, and 21 (1982) 432 of same and also 23 (1984) 401 of same, and accordingly, its detailed explanation is omitted.

Figure 4:
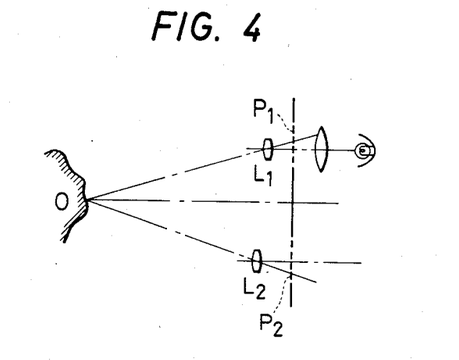
FIGS. 4 and 5 are illustrations for explaining the principle for allowing the observer to know the unevenness of the surface of an object by utilizing Moiré fringes.
Figure 5:
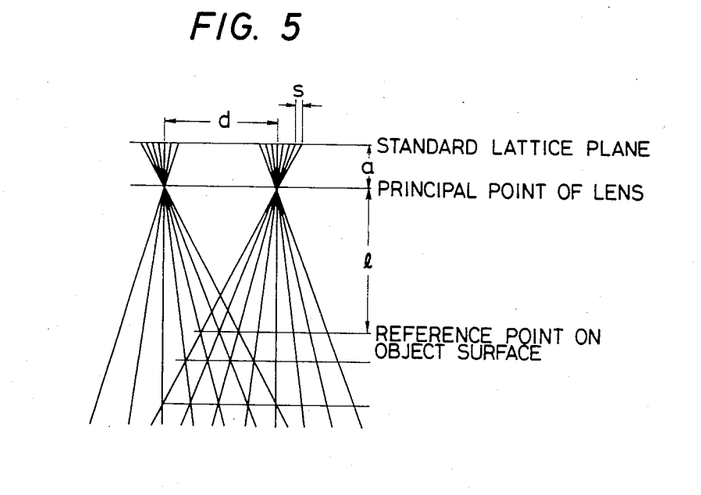

Now a brief description will be provided of the principle that the concavo-convex (i.e. uneven) surface of the object can be ascertained by Moiré fringes or stripes. The method employed in the present invention is called the projection method. As shown in FIG. 4, lattice $P_1$ is projected onto an object O through a lens $L_1$ to form the image of the object O by a lens $L_2$, so that this object image is observed through a lattice $P_2$. The image of the lattice $P_1$ projected onto the object O deforms in accordance with the concavo-convex (uneven) pattern of the surface of the object O, and Moiré fringes are formed between the image of this deformed lattice $P_1$ and the lattice $P_2$. To make the explanation simple, let us here suppose that the projection lens $L_1$ is the same as the focusing lens $L_2$, and that the lattice $P_1$ is same as the lattice $P_2$, respectively. Then, as shown in FIG. 5, it is assumed that the distance between the lattice and the principal point of the lens facing the lattice is assumed to be a, the distance between the principal point of the lens and the reference point (to be determined appropriately) at the surface of the object O to be l, the distance between the principal points of the respective lenses to be d, the focal distance of respective lenses to be f, the pitches of the respective lattices to be S, and the frequency of Moiré fringes to be N. Then, the depth of the N-th Moiré fringe as counted from the reference point will be given by:

$$\frac{h_N}{h_N + l} = \frac{NMS}{l} \text{ (wherein: } M \text{ represents the magnification of the lens)}$$

$$h_N = \frac{NlSM}{d - NSM}$$

Figure 6:
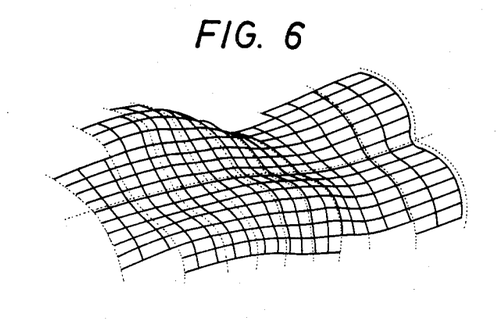
FIG. 6 is a diagrammatic illustration showing the unevenness of the surface of an object which is to be shown on the display.
Figure 7:
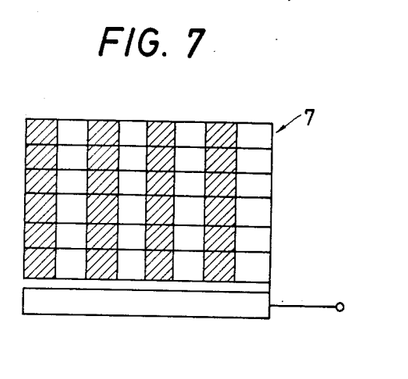
FIG. 7 is a diagrammatic illustration showing the signal readout section of a solid-state image sensor.
Figure 8:
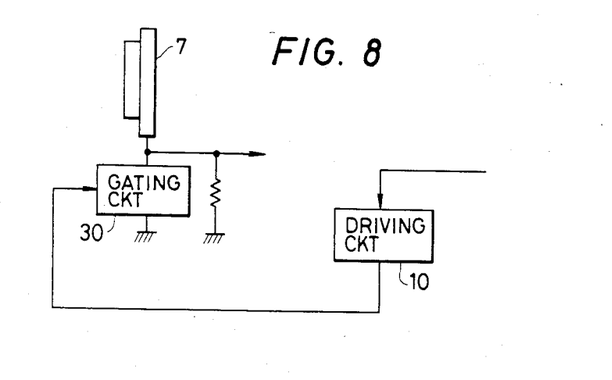
FIG. 8 is a block diagram showing a signal readout circuit of the solid-state image sensor.
Figure 9:
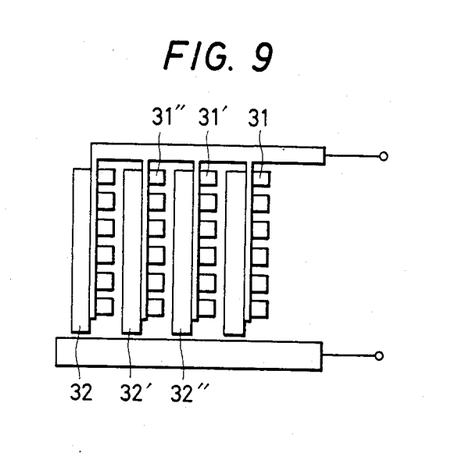
FIG. 9 is a diagrammatic illustration showing the structure of an interline transfer type solid-state image sensor.

In this way, it is possible to know the concavo-convex (uneven) appearance of a given surface by utilizing Moiré fringes. The above-mentioned calculation is performed by the measuring and processing circuit 26. Furthermore, by means of the microcomputer which is contained in this measuring and processing circuit, there is performed the processing of the signals necessary for the depiction, on the display 29, of such a diagram pattern as shown in FIG. 6. As will be understood from the above explanation, the light-emitting end face of the light guide 2 in, for example, the embodiment of FIG. 1 corresponds to the lattice $P_1$, and the light-receiving face of the solid-state image sensor 7 corresponds to the lattice $P_2$. Also, an arrangement may be made so that the signals delivered from the measuring and processing circuit 26 are outputted to various data terminal devices such as a magnetic disc memory, or to an X-Y plotter. It should be noted here that the arrangement is provided such that, at the time of observation utilizing infrared light, there is read out a signal from picture elements of every other row (see FIG. 7) or every other column of the solid-state image sensor 7. Accordingly, there is obtained a contour image formed by Moiré fringes in the same way as that obtained when the object 5 under survey is observed via the lattice having a pitch representing the width or distance between the rows of picture elements of the solid-state image sensor 7. For this reason, either by providing a gating circuit 30 at the output portion of the solid-state image sensor 7 as shown in FIG. 8, and by alternately switching this circuit 30 to "on" and "off" in synchronism with the driving pulses of the driving circuit 10 of the solid-state image sensor 7, or by reading out signals from the memory 18 in correspondence to the outputs of the image elements of every other row or column of the solid-state image sensor 7, or by performing image processing by the measuring and processing circuit 26, there are read out signals delivered from the picture elements of every other row or column of the solid-state image sensor 7. Furthermore, in the case of the solid-state image sensor of the interlacing type, it is possible to easily read out signals of every other row or column by deriving signals of only the first field or the second field. Also, from the fact that the picture elements themselves of the solid-state image sensor are arranged in the form of a lattice, it will be understood that especially in the case of an interline transfer type solid-state image sensor (see FIG. 9) wherein vertical transfer registers 32, 32', 32", ... are arranged between light-sensitive sections 31, 31', 31", ... forming non-sensitive zones, it is also possible to obtain a contour image due to Moiré fringes by the output signals from all the picture elements instead of by the signals from every other row or column.

Figure 10A:
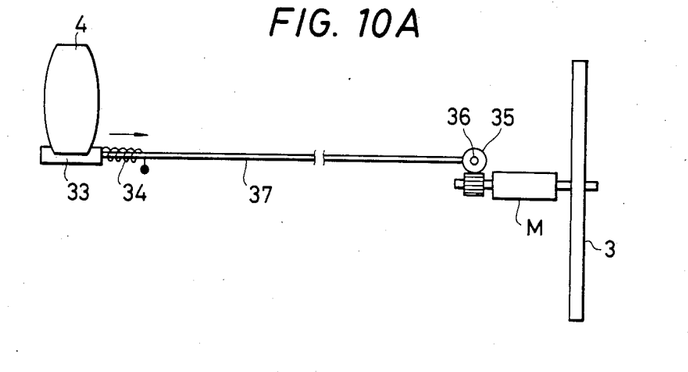
FIGS. 10A and 10B are diagrammatic illustrations showing the entirety and a part, respectively, of an illuminating lens moving mechanism.
Figure 10B:
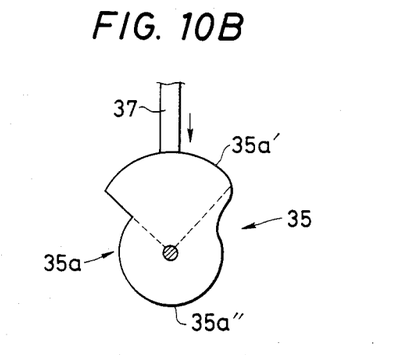

FIGS. 10A and 10B show a mechanism for moving an illuminating lens 4 in such a way that, only when the infrared light transmitting sector 3d of the rotary filter 3 is inserted in the path of light beam in synchronism with the rotation of the rotary filter 3, the light-emission end of the light guide 2 is focused on the object 5 under observation, and that when the other light-transmitting sectors 3a, 3b or 3c of the rotary filter 3 are inserted in the path of light, the light-emission end of the light guide 2 is projected as a blurred image onto the object 5 under observation. Numeral 33 represents a lens frame for supporting the illuminating lens 4 advanceably and retreatably in the direction of the optical axis; 34 a spring having its one end fixed to the lens frame 33 for pulling the lens frame 33 in the direction of the arrow; 35 a cam plate provided on a shaft 36 which is arranged to be brought, by such means as a worm gear, into engagement with the shaft of the motor M which is assigned to rotate the rotary filter 3 and which makes one revolution during one rotation of the rotary filter 3. One end of a rod 37 having its other end fixed to the lens frame 33 abuts, by means of the spring force of a spring 34, a cam face 35a of the cam plate 35. The cam face 35a is constructed to have a shape such that, when the infrared light transmitting sector 3d of the rotary filter 3 is inserted in the path of light, the rod 37 is brought into contact with the larger-diameter portion 35a' extending through about 90 degrees of the cam face 35a of the cam plate 35, and that when the other light-transmitting sector 3a, 3b or 3c is inserted in the path of light, said rod 37 is in contact with the remainder smaller-diameter portion 35a'' of the cam face 35a of the cam plate 35. It should be understood that, when the rod 37 is in contact with the larger-diameter portion 35a' of the cam face 35a, the illuminating lens 4 is at a position of focusing the light-emission end of the light guide 2 on the object 5 under observation. In case, however, the rod 37 is abutting the smaller-diameter portion 35a'' of the cam face 35a, the illuminating lens 4 is located at a position closer to the light-emission end of the light guide 2, so that the light-emission end of this light guide 2 is projected, as a blurred image, onto the object 5 under observation. Thus, in case of illumination by red light, green light or blue light, it will be noted that, among the core and clad which constitute the individual optical fibers of the light guide 2, only the core will illuminate, so that the mesh-like illumination which can be produced when the light-emission end of the light guide 2 is focused on the object 5 under survey is eliminated due to blurring. In case of illumination by infrared light, however, the light-emission end of the light guide 2 is clearly focused in a stripe pattern on the object 5 under examination.

Figure 11A:
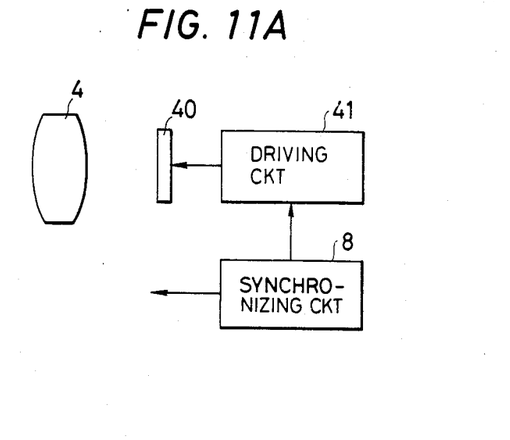
FIGS. 11A and 11B are diagrammatic illustrations, respectively, for explaining a second embodiment of the present invention.
Figure 11B:
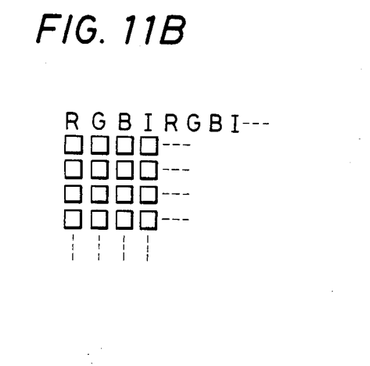
Figure 12A:
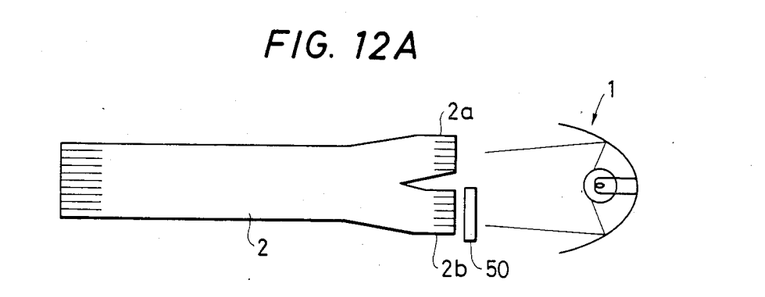
FIGS. 12A, 12B and 12C are diagrammatic illustrations for explaining a third embodiment of the present invention.
Figure 12B:
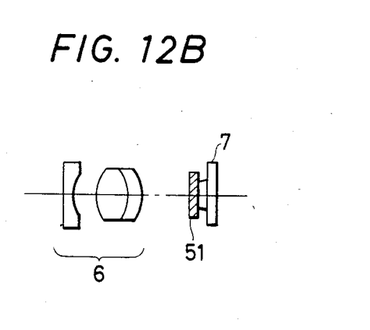
Figure 12C:
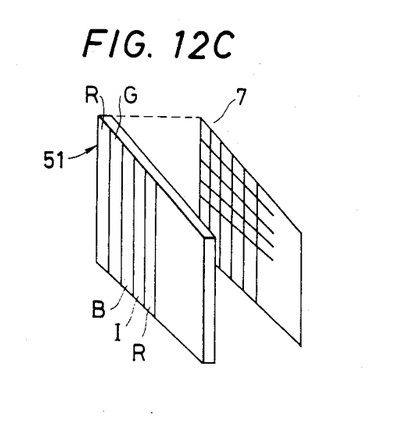

FIGS. 11A and 11B show a second embodiment of the present invention. Numeral 40 represents an LED array (see FIG. 11B) consisting of successively arranged rows R, G, B and I of LEDs (which may be semiconductor laser, for example) emitting red light, green light, blue light and infrared light, respectively, at the position of the light-emission end of the light guide 2, in place of the light supply lamp 1, the light guide 2 and the rotary filter 3 which are employed in the embodiment of FIG. 1. The remains arrangement of this second embodiment is similar to that of the embodiment of FIG. 1. According to this arrangement, the rows of LED array are lighted up successively in the order of R, G, B and I by a driving circuit 41 based on a control signal delivered from the synchronizing circuit 8, whereby there can be performed face-after-face type image-pickup operation. In this case also, if an arrangement is provided so as to move the illuminating lens 4 in the same way as in FIG. 10, it will be understood that, in case of illumination by red light, green light or blue light, the object 5 under observation will be illuminated substantially uniformly due to blurring. It should be noted here that an arrangement may be provided so that the signals from the solid-state image sensor are read out for example once every two rows or three rows in accordance with the time intervals of emission of light from the LEDs.

Figure 13:
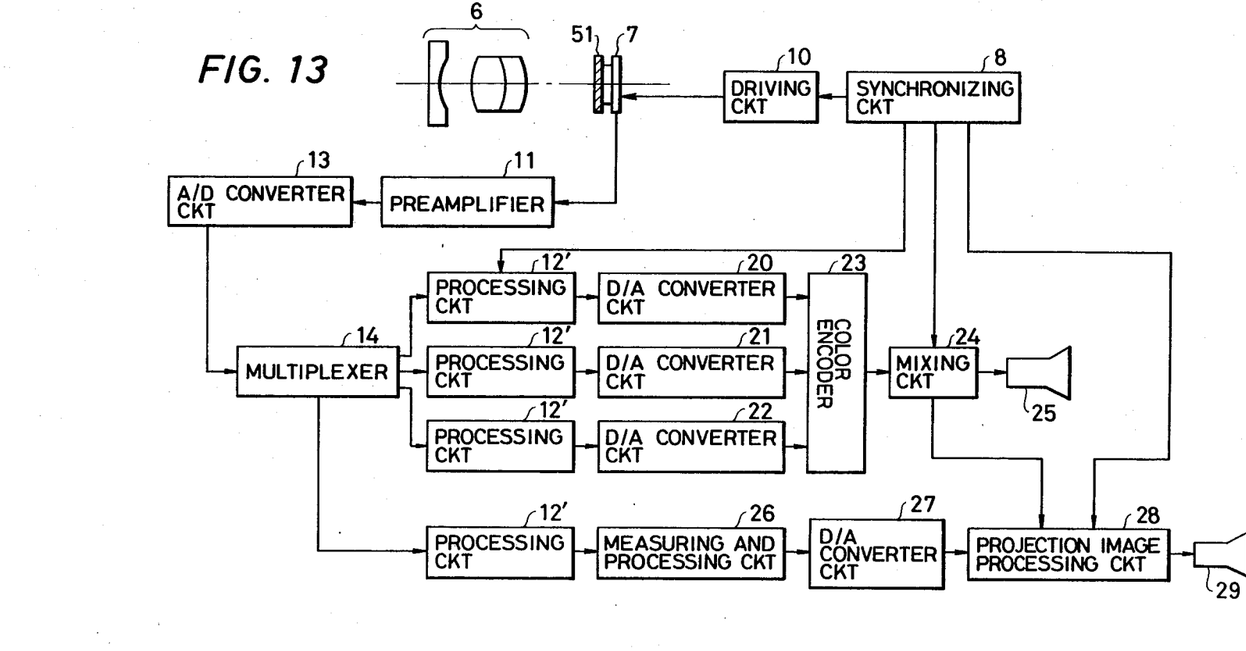
FIG. 13 is a block diagram of the electric circuit portion which is applied to the third embodiment.

FIGS. 12A, 12B, 12C and 13 show a third embodiment of the present invention. In place of the rotary filter 3 employed in the embodiment of FIG. 1, there is disposed an infrared light cutting filter 50 (FIG. 12A) in the foreground of the light-emission end 2b of the light guide 2. Also, a color-separating stripe filter 51 (FIGS. 12B and 12C) is disposed in the foreground of the solid-state image sensor 7, so that visible light impinges onto the two light-incidence ends 2a and 2b of the light guide 2, whereby the light emits through the entire region of the light-emission end of the light guide 2 to illuminate the object 5 under survey. However, infrared light enters only through the light-incidence end 2a of the light guide 2 due to the function of the infrared light cutting filter 50, so that the light emits through the light-emission end of the light guide 2 at every other row of optical fibers to illuminate the object 5 under survey in a stripe pattern. The image of the object 5 under observation thus illuminated is focused on the solid-state image sensor 7 by the objective lens 6. The output signal of the solid-state image sensor 7 is amplified by the preamplifier 11, and it is converted to a digital signal by the A/D converter circuit 13, and thereafter it is distributed into image signals produced by red light, green light, blue light and infrared light, respectively, as allotted by the multiplexer 14, as shown in FIG. 13. After these respective signals are processed by the processing circuit 12', the image signals produced by red light, green light and blue light are converted to analog signals by the D/A converter circuits 20, 21 and 22, respectively, and they are supplied to the color encoder 23 whereby a video signal is formed. This video signal is supplied to the mixing circuit 24 to become a compound image projection signal. By this image projection signal, a color projection image is presented on the color display 25. Also, the infrared light is processed by the measuring and processing circuit 26, and thereafter it is converted to an analog signal by the D/A converter circuit 27, and then it is converted further to a compound image projection signal by the projection image processing circuit 28 to present a contour image on the color display 29. It should be understood here that the stripe filter 51 requires that the sector I intended to transmit infrared light to be of lattice form. With respect to the sectors R, G and B which transmit red light, green light and blue light, respectively, they may be formed in mosaic pattern instead of lattice form. In such a case, however, the color-separating circuit will need some modification in its arrangement.

In the above-state description, in the first and second embodiments, the observation by utilizing Moire fringes employs infrared light. It should be understood, however, that in place of infrared light, there may be used visible light such as red light, green light and blue light. Also, in the respective embodiments stated above, it is also possible to use invisible light such as ultraviolet light in place of infrared light.

In the above-mentioned description, the principle of the present invention has been stated with respect to endoscope. It should be understood, however, that this principle is not limited thereto, but it can be applied also to optical instruments which perform Moiré topography.

What is claimed is:
1. A measuring endoscope for measuring an object, comprising:
 an endoscope body having a foremost end portion;
 illumination light supply means housed within said body of said endoscope and having a number of regularly arranged fine light-emitting sectors, for supplying illumination, said illumination light supply means comprising a light guide including a bundle of a plurality of optical fibers, said bundle having two light-incidence end portions, said plurality of optical fibers being arranged at a light-emission end of said light guide to form a plurality of alternate rows of fibers in such a manner that those optical fibers included within one of the two light-incidence end portions and those optical fibers included within the other light-incidence end portion are arranged in alternate rows relative to each other at the light-emission end portion of the light guide;
 image focusing means, housing in said foremost end portions of said endoscope body, for forming an image of said object from illumination reflected from said object;

image pickup means, housed within said endoscope body and having a number of picture elements disposed regularly at a position at which said image of the object is formed by said image focusing optical means, for picking up said object image;

controlling means, associated with said illumination light supply means, for controlling the illumination supplied to said fine light-emitting sectors to cause said illumination light supply means to emit light in lattice form;

image processing means, connected to said image pickup means, for performing a three-dimensional measurement of said object; and display means, connected to said image processing means, for displaying information corresponding to the said three-dimensional measurement.

2. A measuring endoscope according to claim 1, further comprising a magnetic disc memory connected to said image processing means to store information regarding said three-dimensional measurement.

3. A measuring endoscope according to claim 1, further comprising an X-Y plotter connected to said image processing means.

4. A measuring endoscope according to claim 1, wherein said illumination light supply includes an incandescent light supply, and an infrared light cutting filter disposed adjacent one of said two light-incidence end portions, and wherein said image pickup means comprises a solid-state image sensor and a color-separating stripe filter disposed adjacent said solid-state image sensor.

5. A measuring endoscope according to claim 1 wherein said image pickup means comprises a solid-state image sensor constructed so that, at a time of observation using an infrared light as said illumination, signals are read out from every other row or column of said picture elements.

6. A measuring endoscope according to claim 1, wherein said image pick-up means comprises a solid-state image sensor and a color-separating stripe filter disposed adjacent said solid-state image sensor, and wherein said controlling means comprises a rotary filter facing the light-incidence end faces of said light guide and has a red light transmitting sector, a green light transmitting sector, a blue light transmitting sector and an infrared light transmitting sector, and wherein said infrared light transmitting sector is constructed to cause an infrared light to impinge onto only one of the two light-incidence end portions of said light guide.

7. A measuring endoscope according to claim 6, further comprising driving means coupled to said image focussing means for moving said image focussing means to focus illumination emitted from said bundle on said object only during a period in which said infrared light transmitting sector is inserted in a path of light from said light supply means in synchronism with a rotation of said rotary filter.

8. A measuring endoscope according to claim 6 wherein said light supply means comprises an LED array having successibly arranged roads of LEDs emitting a red light, a green light, a blue light, and an infrared light, respectively, and wherein said controlling means comprises a driving circuit for repetitively causing said rows of LEDs of said LED array to emit a red light, a green light, a blue light, and an infrared light, respectively, in a predetermined order.

9. Endoscope apparatus for forming a three-dimensional image of an object, comprising:

illumination supply means for providing a plurality of distinct illuminations including infrared illumination;

illumination transmission means, having an illumination input end and an illumination output end, for receiving and transmitting said plurality of illuminations, said illumination transmission means having a first group of light channels separated from a second group of light channels at said illumination input end, said light channels being arranged in alternating rows of said first and second groups, respectively, at said illumination output end, said first group of light channels transmitting said infrared illumination;

projecting means adapted for projecting illumination from said illumination output end onto said object;

objective means for focusing illumination reflected from said object;

image sensor means for receiving the focused illumination reflected from said object and providing electrical signals corresponding thereto; and processing means for receiving said electrical signals and providing output signals having information corresponding to said three-dimensional image of said object.

10. Apparatus according to claim 9 wherein said image sensor means includes a plurality of light sensor elements arranged in a matrix-like structure having columns and rows, and wherein said image sensor means provides said electrical signals from every other row or every other column.

11. Apparatus according to claim 9 wherein said image sensor means includes a plurality of light sensor elements arranged in a matrix-like structure having columns and rows, and wherein said processing means includes memory means for storing said electrical signals column-by-column or row-by-row, and wherein said processing means processes the stored electrical signals from every other row or every other column.

12. Apparatus according to claim 9 wherein said illumination supply means includes:

an illumination source means for supplying a single illumination; and illumination variation means, interposed between said illumination source means and said illumination transmission means for causing said single illumination to be transposed into said plurality of distinct illuminations in a time dependent manner.

13. Apparatus according to claim 12 wherein said illumination variation means includes a rotary filter having an infrared transmitting sector adapted to allow said infrared illumination to enter said first group of light channels while preventing said infrared illumination from entering said second group of light channels.

14. A measuring endoscope for measuring an object, comprising:

a main body for holding said endoscope, said main body having proximal and distal end portions;

light supply means for supplying a plurality of distinct illuminations;

illumination light emitting means, arranged within said distal end portion of said main body and including a plurality of fine light emitting sections, for emitting said plurality of distinct illuminations, only one part of said light emitting sections emitting one of said distinct illuminations to form a lattice-shaped light emitting pattern;

image forming means arranged within said distal end portion of said main body, for forming an image of said lattice-shaped light emitting pattern on said object when said illumination light emitting means fomrs said lattice-shaped light emitting pattern;

objective means arranged within said distal end portion of said main body, for forming an image of said object from illumination reflected from said object, said image being formed at an image forming position of said objective means;

image pickup means disposed at said image forming position of said objective means and having a light receiving surface comprising a plurality of picture elements arranged in columns and rows, for receiving said image from said objective means and converting it into electrical signals;

image processing means, connected to said image pickup means, for processing selected electrical signals from among said electrical signals provided by said image pickup means, said selected electrical signals being obtained from picture elements corresponding to a position where said image of said lattice-shaped light emitting pattern is formed on said light receiving surface, said image processing means forming a three-dimensional measurement of said object;

control means disposed adjacent said light supply means, for controlling said distinct illuminations provided to said fine light emitting section so that said illumination light emitting means emits a lattice-shaped light pattern; and display means coupled to said image processing means, for displaying information corresponding to said three-dimensional measurement.

15. A measuring endoscope according to claim 14, wherein said light supply means comprises an LED array having successively arranged rows of LEDs emitting a red light, a green light, a blue light and an infrared light, respectively, and wherein said control means comprises a driving circuit for repetitively causing said rows of LEDs of said LED array to emit a red light, a green light, a blue light and an infrared light, respectively, in a predetermined order.

16. A measuring endoscope according to claim 15, wherein said image pickup means comprises a solid-state image sensor constructed so that, at a time of observation using an infrared light as one of said distinct illuminations, signals are read out from every other row or every other column of the picture elements.

17. A measuring endoscope according to claim 15, wherein said image pickup means comprises a solid-state image sensor having picture element arranged in lattice form.

18. A measuring endoscope according to claim 4, wherein said illumination light emitting means comprises an optical fiber bundle formed of a plurality of optical fibers and has first and second bifurcated portions at a light incidence end of said fiber bundle, a light emission end face of said bundle being arranged so that respective fibers of said bifurcated portions are alternatedly disposed in rows, said bundle being arranged so that said light emission end face is provided within said distal end portion of said main body, and wherein said light supply means projects light upon respective bifurcated portions of said light incidence end face, and wherein said control means comprises a light cutting means provided between said light incidence end face and said light supply means, for making at least a part of said distinct illuminations incident upon only one of said bifurcated portions.

19. A measuring endoscope according to claim 18, wherein said control means further comprises an infrared cutting filter arranged between said light supply means and one of said bifurcated portions, and wherein said image pickup means comprises a solid-state image sensor and a color-separating stripe filter disposed adjacent said solid-state image sensor, said image pickup means having a lattice-shaped stripe which transmits only infrared light.

20. A measuring endoscope according to claim 18, wherein said control means further comprises a rotary filter facing the light incidence end face of said optical fiber bundle and has a red light transmitting sector, a green light transmitting sector, a blue light transmitting sector, and an infrared light transmitting sector.

21. A measuring endoscope according to claim 20, wherein said image pickup means comprises a solid-state image sensor having picture elements arranged in lattice form.

22. A measuring endoscope according to claim 20, wherein said image pickup means comprises a solid-state image sensor constructed so that, at a time of observation using an infrared light as one of said distinct illuminations, signals are read out from every other row or every other column of the picture elements.

23. A measuring endoscope according to claim 22, further comprising driving means coupled to said image forming means to move said image forming means to focus light emitted from said bundle on said object only during a period in which the infrared light transmitting sector is inserted in a path of light from said light supply means in synchronism with a rotation of said rotary filter.

* * * * *

UNITED STATES PATENT AND TRADEMARK OFFICE
CERTIFICATE OF CORRECTION

PATENT NO. : 4,656,508

DATED : April 7, 1987

INVENTOR(S) : Akira Yokota

It is certified that error appears in the above-identified patent and that said Letters Patent is hereby corrected as shown below:

IN THE CLAIMS

Col. 8, Claim 1, line 66, "housing" should read -- housed --;

line 67, "portions" should read -- portion --.

Col. 11, Claim 14, line 8, "fomrs" should read -- forms --.

Col. 12, Claim 17, line 1, "element" should read -- elements --.

Col. 12, Claim 18, line 3, "claim 4" should read -- claim 14 --.

Signed and Sealed this

Twenty-seventh Day of September, 1988

Attest:

DONALD J. QUIGG

*Attesting Officer*  *Commissioner of Patents and Trademarks*